May 25, 1954 B. LIPPEL ET AL 2,679,644

DATA ENCODER SYSTEM

Filed April 3, 1951 2 Sheets-Sheet 1

*INVENTORS*
BERNARD LIPPEL
JOSEPH A. BUEGLER

*BY* Harry M. Saragovitz
Attorney

May 25, 1954 B. LIPPEL ET AL 2,679,644

DATA ENCODER SYSTEM

Filed April 3, 1951 2 Sheets-Sheet 2

INVENTORS
BERNARD LIPPEL
JOSEPH A. BUEGLER

BY Harry M. Saragovitz
Attorney

Patented May 25, 1954

2,679,644

UNITED STATES PATENT OFFICE 2,679,644

DATA ENCODER SYSTEM

Bernard Lippel and Joseph A. Buegler, Red Bank, N. J., assignors to the United States of America as represented by the Secretary of the Army Application April 3, 1951, Serial No. 219,103

4 Claims. (Cl. 340—354)

Figures 1, 2:
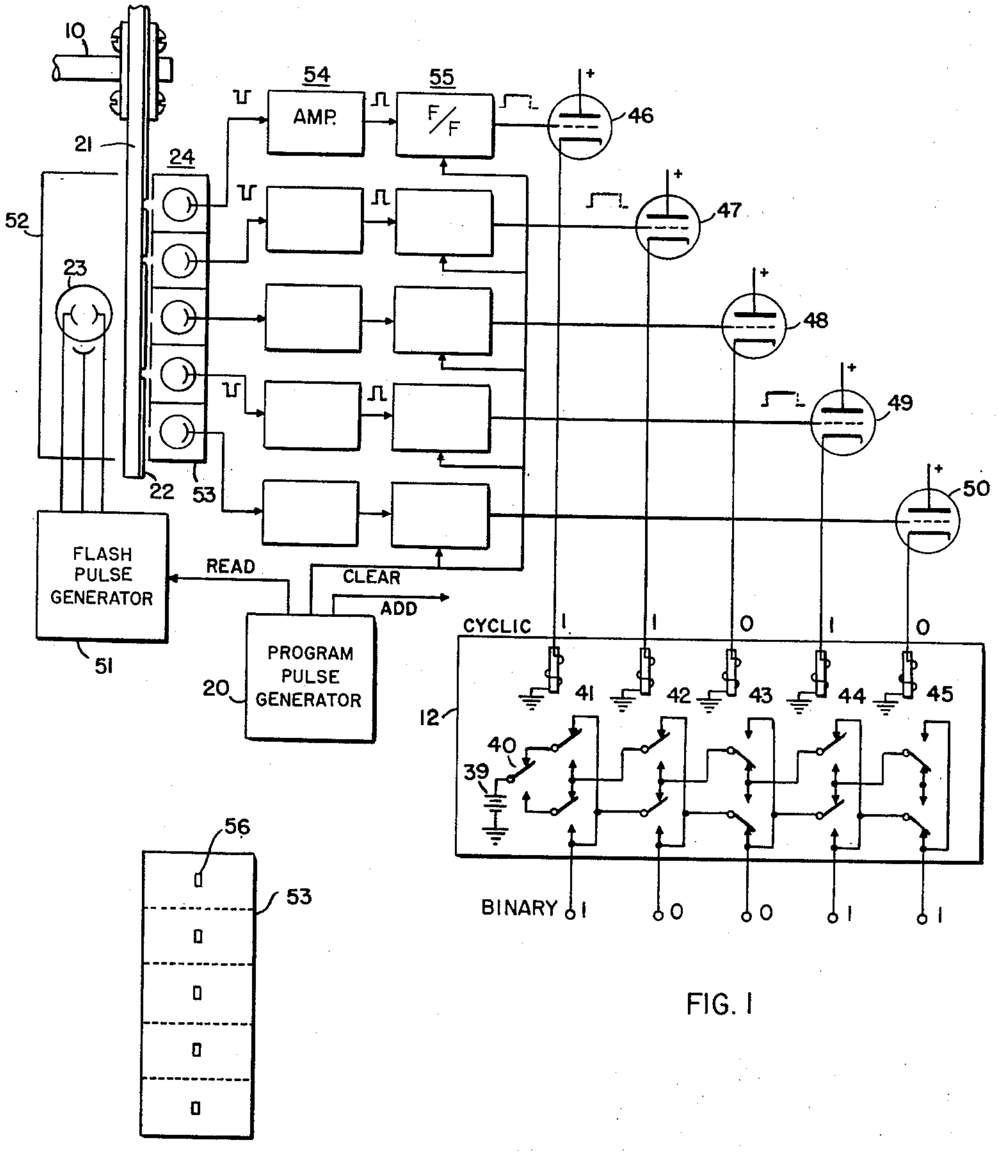

(Granted under Title 35, U. S. Code (1952), sec. 266)

The invention described herein may be manufactured and used by or for the Government for governmental purposes, without the payment of any royalty thereon.

This invention relates to encoders for pulse code modulation. In particular the invention relates to encoding devices in a data transmission system for periodically encoding analogue values of data as digit signals of binary code numbers. More particularly, the invention relates to encoding analogue values as digit signals of code numbers simultaneously and in parallel channels.

The invention also relates to translating digital signals from one number code to another number code simultaneously and in parallel channels.

In the art of pulse code modulation and data transmission systems the encoding of an analogue value of a signal amplitude or of a coordinate of information such as the angular position of a shaft has heretofore been accomplished by encoding arrangements which operate to produce the digit signals serially in time and generally the digital code employed is the standard binary code which has advantages in certain parts of the transmission system but for the encoding operation has disadvantages.

Accordingly, it is an object of the present invention to encode analogue values of data as digit signals in a manner which avoids many of the disadvantages and limitations of prior art practice.

It is a further object of the present invention to provide an encoder for generating from analogue values of data corresponding digital signals of a number code recurrently at a chosen sampling rate and simultaneously in parallel channels.

It is a particular object of the invention to provide, in a data transmission system, an encoder for recurrently producing code groups of digit signals which define with great precision the instantaneous relative positions of an encoding member and an index member.

In accordance with the present invention in a data transmission system an encoder is provided for encoding analogue data as digital signals of a number code, comprising an encoding member and an index member arranged for relative motion in proportion to the analogue value. The encoding member is provided with coding elements distributed in the direction of the motion which divide the total range of motion into a chosen number of quantized positions, each identified by a digital code number. Means are also provided, operatively coupling between the encoding member and the index member, for generating simultaneously and in parallel channels at a predetermined sampling rate the digit signals of a number representing instantaneous relative positions of the encoding and the index members.

Also, in accordance with the present invention in a data transmission system the encoder comprises means for encoding in parallel channels the analogue values of data as digital code group signals in cyclic binary code and means for simultaneous parallel translation of the signals to digit signals in standard binary code, comprising a source of potential, relay operated reversing means for each digit position of the code group wherein the reversing means are connected in series to the source of potential. Also provided are means operatively coupling an input signal source each to a one of the reversing means and means for deriving an output digital signal from each one of the reversing means whereby an input digital signal in any position of the code group reverses the output signals in all subsequent positions of the group.

For a better understanding of the invention, together with other and further objects thereof, reference is had to the following description taken in connection with the accompanying drawing, and its scope will be pointed out in the appended claims.

Figure 3:
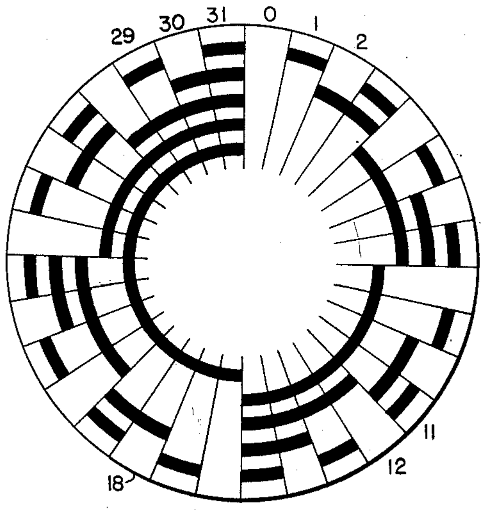
Figure 4:
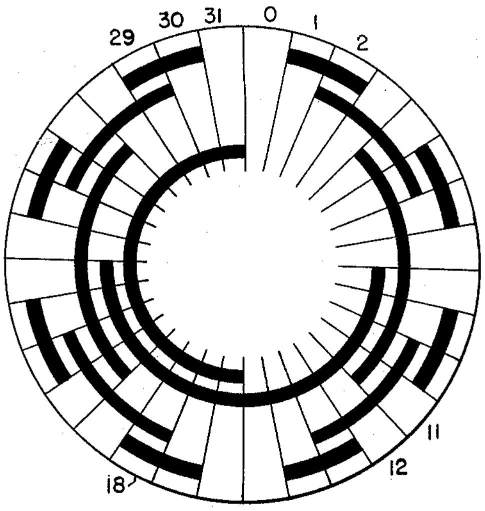
Figure 5:
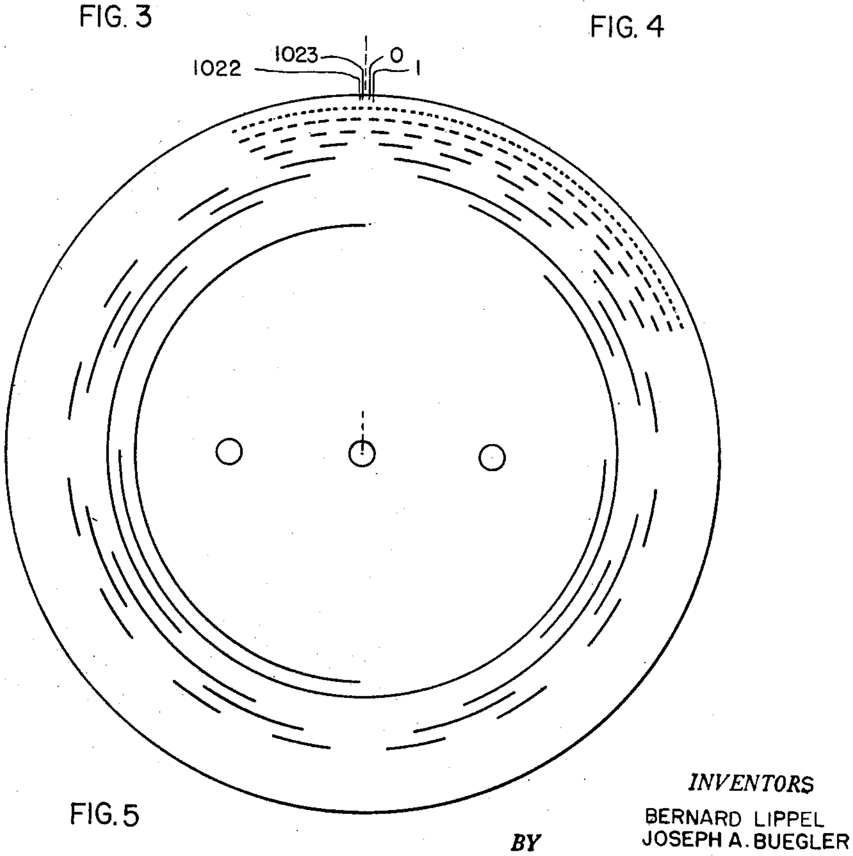

In the drawings, Fig. 1 illustrates by a diagram, partly in block and partly schematic, the encoder and code translator of the present invention; Fig. 2 illustrates the indexing or reading head of the encoder; Figs. 3 and 4 illustrate respectively the form of coding wheels employed for standard binary and cyclic binary coding; Fig. 5 illustrates a practical form of coding wheel arranged to encode analogue data as ten digit numbers in cyclic binary code.

Referring now more particularly to Fig. 1, there is shown an encoder in accordance with a preferred arrangement of the present invention. This encoder is also shown as block units as a part of Fig. 1 of a patent application, Serial No. 219,101, entitled "Data Transmission System" filed concurrently herewith in the name of Millard M. Brenner, et al., and assigned to the same assignee, the Government of the United States. In Fig. 1 of the referred to application the encoder is represented by a block unit 11 and its functioning is described. Here it is shown and described in detail. The program pulse generator, block unit 20 of that application, is here similarly shown and labeled. The code translator block unit 12 of that application and here similarly labeled, is shown in detail as to the translating circuits. Thus in Fig. 1, a coding wheel 21, made of transparent material and having an opaque coating 22, is mounted to rotate with an input shaft 10. The illustration here is for five digit binary code and in the description which follows it will be assumed that the wheel is provided with commutating segments of the form shown for cyclic binary code in Fig. 4. The commutator segments of the five rings shown in black in Fig. 4 are here provided by removing corresponding segments of the opaque coating so that light may be transmitted through these openings to provide commutating operation by means of photoelectric pick-up elements. It will be understood that the shaft 10 may be stationary or rotate rapidly or slowly, and in either direction, and may stop and reverse. Accordingly, the arrangement of the present invention provides for coding the instantaneous position of wheel 21 and, therefore, of shaft 10 during short intervals at a regular periodic repetition rate. To provide this recurrent sampling, program generator unit 20 provides, at a chosen sampling rate, a sequence of read, add and clear pulses. The add pulse is used in the complete system as shown in the aforementioned patent application and is not used in the encoding process. The read pulse which occurs first in the time sequence of operations actuates a flash pulse generator 51 and the output of 51 is coupled to the terminals of a gas-filled flash lamp 23 inclosed in a housing 52 located adjacent the face of the wheel 21 opposite to the face which is coated. The housing 52 preferably is arranged to confine the illumination along a narrow path radially aligned with wheel 21. A plurality of photo-electric pick-up tubes labeled collectively 24 are individually inclosed within compartments of a reading head or index member 53. The reading head face is shown in Fig. 2 and will be seen to have in alignment five narrow openings or slits collectively labeled 56 for admitting light selectively to each photo pick-up element. The reading head, as shown in Fig. 1, is positioned so that the slits 56 are aligned radially with the wheel so that light from the flash lamp 23, passing through the transparent wheel 21 and through openings in the rings, is received by the photocells 24. It will be clear by referring to Figs. 4 and 5, that the particular photocells which are actuated by light passing through the wheel will depend upon the wheel position and that for our illustration of five digit encoding there are 32 different digit signal combinations which may be generated. The photo elements 24 are coupled by parallel channels to the input of D.-C. amplifiers collectively labeled 54 and the output of each amplifier 54 is coupled to the input of a bistable multivibrator or flip-flop unit, the five units being labeled collectively 55.

The outputs of the units 55 are coupled in order to the control elements of electron tube amplifiers 46, 47, 48, 49 and 50 and the cathode element of each amplifier tube is connected to ground through the solenoid of a corresponding relay switch 41, 42, 43, 44 and 45 of translator 12. The relay switches are each of the double pole, double throw type normally in the down position as has been shown.

Prior to each reading, that is, each flash of light from tube 23, a clear pulse from program generator 20 is simultaneously applied to each of the flip-flop units 55 by the connection shown to restore them to an initial operating position.

Consider now the operation of the system thus far described. The cycle of operation which is periodically repeated is, first, the illumination of a narrow sector of wheel 21 for a short time interval effectively to actuate the exposed photocells 24 and so to read an instantaneous position of shaft 10. In the drawing, the sector of the disk or the wheel which is exposed through openings in the coating 22 is such that reading from top to bottom the first, second and fourth of the five photocells 54 receive light and the output of each is indicated as a negative pulse. It is here assumed that the coded or transparent portions of the opaque coating 22 are in cyclic binary code corresponding to the arrangement shown in Fig. 4. It will be clear from an inspection of this figure that the sector of the wheel being exposed or sampled is the sector nineteen, which in cyclic binary code is written as 11010. The wave forms shown at the outputs of the first, second and fourth D.-C. amplifiers 54, which correspond to the first, second and fourth positions of the binary number, indicate the transmission of a pulse, shown on the drawing as a positive pulse, to the input of the first, second and fourth amplifier flip-flop units 55. The units 55 are assumed to be biased or conditioned by the earlier occurrence of a clear pulse so that the ouput of each unit is of low value here referred to as zero output. The application of a positive pulse at the input of any unit will reverse this condition to provide a maximum output, here shown and referred to as a positive output or a digit signal output and this output will remain until a clear pulse restores all units to the initial condition. Thus in the drawing for sampling of sector nineteen an output is provided only at the control grids of tubes 46, 47 and 49 and the storage or maintenance of the signals on these grids is indicated by the wave form diagrams of relatively long pulses which endure until the occurrence of the clear pulse as indicated by the dotted trailing edge of the pulses. Since the solenoids or relay control elements for the translator switches 41—45 are included in the cathode circuits of tubes 46—50, and the flip-flop units 55 are directly coupled to their control grids, the operation is to register all generated digit signals simultaneously and in parallel channels. Directly coupled here means that the connections of the units 55 to the plurality of vacuum tubes 46—50 are D.-C. connections and the cathode circuits of these tubes therefore hold in storage or in register the sampled data in the form of digit signals in parallel channels.

Since the operation above described is repeated periodically at the chosen repetition rate of generator 20, it will be clear that the arrangement operates to encode in parallel channels the analogue values, that is, the position of shaft 10 as digital code group signals in cyclic binary code. The encoding member is the disk 21 having the coating 22 with transparent portions arranged in accordance with Fig. 4 of the drawing. The coding or commutating elements of the wheel therefore comprise five rows of commutating elements which are divided in the direction of rotation into $2^5$ or 32 sectors. The program generator 20 operating flash lamp 23 via the generator 51, provides means operative during recurrent intervals at a chosen sampling rate for coupling between the index member or reading head 53 and the commutating elements within a narrow indexing width which should not exceed the width of a sector. The pick-up elements 24 and the associated output units described comprise means responsive to the coupling for generating and registering simultaneously and in five parallel channels the digit signals of a five-digit binary number which represents the instantaneous relative positions of the encoding wheel and the index head 53.

The advantages of employing cyclic code for the encoding process have been recited in the aforementioned patent application. A principal advantage of cyclic code for encoding analogue data relates to the fact that with cyclic binary code the change from one number to the next requires a change of only one digit in the binary number. This will be evident when we consider and compare the wheel arrangements of Figs. 3 and 4. It will be noted that with the standard binary code, more than one digit may change in moving from one sector to the next adjacent one. For example, a change from the sector thirty one to sector zero requires a change of all five digits. Conversely, in the cyclic code arrangement of Fig. 4, at no place around the circle is there a change of more than one digit. When cyclic code is employed, a slight misalignment of the reading head 53 can ordinarily cause a maximum error of only one sector while if standard code were employed, a slight misalignment might produce a signal designating a sector many sectors removed from the correct one.

For other processes in the system, such as comparison of digit number signals and for decoding the digit signals to produce analogue values, the standard binary code is readily employed whereas the cyclic code cannot be directly used without unduly complicated additional apparatus. Accordingly, the translator operates to change the digit signals of the output cyclic code number simultaneously and in parallel channels to digit signals of standard binary code by means of the relay operated switching circuit shown within the block labeled 12.

The principle of translation is as follows: Consider translating the number 18 cyclic, which is 11011, to 18 standard, which is 10010. The rule which can be developed for any number is to reverse all digits following a one, and repeat this operation successively. Therefore, we may write this operation as follows:

(*a*) 18 cyclic=1~~1011~~
(*b*) =10~~100~~
(*c*) =100~~11~~
(*d*) =10010=18 standard The presence of a one in the first digit position of (*a*) required all digits in subsequent positions to be reversed to give (*b*); the presence of a one in the second position of (*a*) also required reversal of subsequent position digits to give (*c*); the presence of a one in the fourth position of (*a*) required reversal of the subsequent position to give (*d*); there being no positions subsequent to the fifth, no reversal operation is required for the presence of a one in the fifth position of (*a*).

Similarly for the number 19, shown in the drawing, only the last switching step is different and the switching operations of reversing all output positions subsequent to the occurrence of a one digit signal can be followed by inspection from left to right. It will be noted that the apparatus in translator unit 12 is arranged to perform the described reversals of digit signals simultaneously. A source of D.-C. potential is provided to which are connected in series the relay operated reversing switches 41—45, one for each digit position, except the last, which need be simply a single pole, double throw switch although a reversing switch has been shown. The input digit signal currents in the cathode circuits operate, each, its appointed switch and an output connection is provided from each switch position. Thus a parallel operation of all switches is effected and standard binary digit signals are produced at the output terminals, simultaneously and in parallel, for transmission to the appropriate unit in the system shown in the referred to patent application. The translator unit 12 is also described and particularly claimed in a divisional application Serial No. 285,526, certified April 25, 1952, filed April 30, 1952.

The code wheel shown in Fig. 5 is a drawing to somewhat reduced size of a coding wheel which has been employed in practice for encoding angular data in cyclic binary code numbers having 10 digits. The wheel is, accordingly, divided into $2^{10}$ sectors of 0.011°, the total number of sectors being 1024. The sectors 1022, 1023, zero and 1 have been labeled on the drawing to indicate the fineness of the divisions.

It will be evident that with a disk having this many divisions, or disks having a higher number as may be required for some services, the problem of aligning a corresponding number of photocell elements will require the use of very small cells or some method of spacing them because of their physical size. In practice, it has been found preferable to arrange all the cells to be effectively along a radial line by providing optical elements which transmit the light from the sampling apertures 56 to the photocells positioned away from the reading line.

An alternative arrangement is illustrated in U. S. Patent 2,590,110 entitled "System for producing an Encoding Device" which was filed concurrently herewith in the name of Bernard Lippel and assigned to the same assignee, the Government of the United States. As disclosed in that application, two different reading heads may be employed set relative to each other at an arbitrary angle. For this type of indexing arrangement it will be evident that the disk must be made in a corresponding manner so that the commutating segments are staggered in accordance to the way they are to be read in operation.

In the drawing of Fig. 1, the translator unit for converting from cyclic binary code to standard binary code has been indicated as having a cyclic input number 11010 and a standard output number 10011, so labeled on the drawing. The D.-C. source 39 is connected by switch 40 in the up position shown, to provide this result. If, however, the switch 40 is thrown to the down position, the standard binary output digit signals are each reversed so that the reversed binary member will be 01100. The use of the reversed binary number is disclosed in the first mentioned pending application above referred to and so will not be further discussed here.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A data encoder comprising an encoding member and an index member arranged for relative motion over a predetermined range, said encoding member having $n$ rows of commutating elements, said rows being effectively divided in the direction of motion into $2^n$ segments, means for generating programming control pulses recurrently at a chosen rate, said programming pulses comprising "read" pulses and "clear" pulses recurrent at said rate, means operatively responsive to said "read" pulses during recurrent intervals of said chosen rate for coupling between said index member and the elements of said rows within an index width not exceeding the width of a segment, means responsive to said coupling for generating and registering simultaneously and in parallel channels the digit signals of an $n$ digit binary number representing instantaneous relative positions of said encoding member and said index and means responsive to said "clear" pulses for erasing said digit signals from said registering means.

2. A shaft position encoder comprising a shaft having an encoding member arranged for rotation therewith and an index member, said encoding member comprising an opaque circular disc having $n$ rings of commutating elements comprising transparent areas, said rings being effectively divided into $2^n$ sectors, means for generating programming control pulses recurrently at a chosen rate, said programming pulses comprising "read" pulses and "clear" pulses recurrent at said rate, means comprising a light source operatively responsive to said "read" pulses during recurrent intervals of said chosen rate for coupling photoelectrically between said index member and the elements of said rings within an index width not exceeding the width of a sector, means responsive to said coupling for generating and registering simultaneously and in parallel channels the digit signals of an $n$ digit binary number representing the instantaneous position of said shaft relative to said index and means responsive to said "clear" pulses for erasing said digit signals from said registering means.

3. In a data transmission system, a shaft position encoder comprising a shaft having an encoding member arranged to rotate therewith and an index member, said encoding member having $n$ rings of commutating elements, said rings being divided into $2^n$ sectors to provide commutating elements in each sector corresponding to an $n$ digit binary number identifying said sector, means for generating programming control pulses recurrently at a chosen rate, said programming pulses comprising "read" pulses and "clear" pulses recurrent at said rate, means operative during recurrent intervals of said chosen rate for coupling between said index member and the elements of said rings within an index width not exceeding the width of a sector, means responsive to said coupling for generating and registering simultaneously and in parallel channels the digit signals of an $n$ digit binary number representing the instantaneous position of said shaft relative to said index and means responsive to said "clear" pulses for erasing said digit signals from said registering means.

4. An encoder comprising a record member and an index member arranged for relative movement over a predetermined range, said record member being effectively divided in the direction of said movment into $2^n$ contiguous segments, where $n$ is an integer, said segments each comprising $n$ divisions bearing identifying elements, a means for generating programming control pulses recurrently at a chosen rate, said programming pulses comprising "read" pulses and "clear" pulses recurrent at said rate, means operatively responsive to said "read" pulses for coupling between said index member and said record elements within a width not exceeding the width of a segment for periodically generating, simultaneously and in parallel channels the digit signals of the binary number representing the quantized position of said record member relative to said index member, means for storing said digit signals in each of said channels, and means responsive to said "clear" pulses for erasing said digit signals from said storing means.

References Cited in the file of this patent

UNITED STATES PATENTS

| Number | Name | Date |
|---|---|---|
| 2,132,213 | Locke | Oct. 4, 1938 |
| 2,207,743 | Larson | July 16, 1940 |
| 2,295,000 | Morse | Sept. 8, 1942 |
| 2,376,234 | Castro | May 14, 1945 |
| 2,382,251 | Parker et al. | Aug. 14, 1945 |
| 2,436,178 | Rajchman | Feb. 17, 1948 |
| 2,518,022 | Keister | Aug. 8, 1950 |
| 2,533,242 | Gridley | Dec. 12, 1950 |
| 2,537,427 | Seid | Jan. 9, 1951 |
| 2,554,835 | Mallina | May 29, 1951 |
| 2,575,342 | Gridley | Nov. 20, 1951 |
| 2,576,099 | Bray et al. | Nov. 27, 1951 |
| 2,597,866 | Gridley | May 27, 1952 |